Inventor
ALAIN SULMONT

United States Patent Office 3,543,566
Patented Dec. 1, 1970

3,543,566
METHOD OF TESTING METALLIC ARTICLE BY MEANS OF ULTRASONIC BEAMS
Alain Sulmont, Aulnaoye-Aymeries, France, assignor to Societe Anonyme dite: Vallourec, Paris, France
Filed Mar. 8, 1967, Ser. No. 621,665
Claims priority, application France, Mar. 14, 1966, 53,250
Int. Cl. G01n 29/04
U.S. Cl. 73—67.7        6 Claims

ABSTRACT OF THE DISCLOSURE

A method of detecting defects in metallic articles having parallel surfaces by causing an ultrasonic beam to be repeatedly reflected from one of said surfaces to the other so that it will follow a predetermined path in the absence of defects, and detecting any deviation of said beam from said path.

SUMMARY

Figure 1:
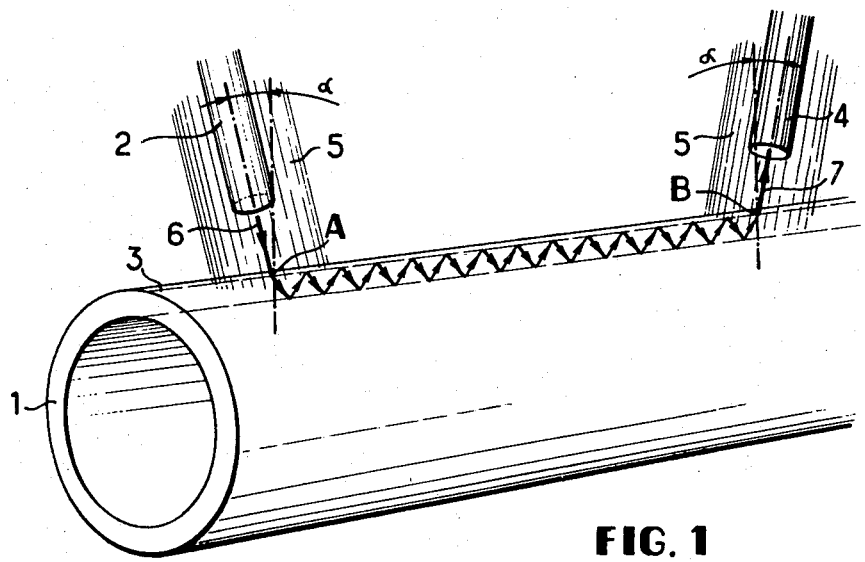

The present invention relates to a new method for non-destructively testing metallic articles, and particularly steel tubes, by means of ultrasonic beams.

Metallic articles have heretofore been tested by means of beams of ultrasonic radiation which are introduced into the metal and which reveal the presence of defects because these waves are checked after having been reflected by the sharp edges which are generally characteristic of such defects.

While such processes are in current use, it is very difficult to detect therewith those defects which are characterized by a geometric shape which does not have any sharp edges.

However, such faults are often produced during the manufacture of steel tubes as a consequence of the presence of metallic or oxide particles pressed into the surface of said tubes while they are being rolled.

Local variations in the thickness of the tube result, and while these variations are not large, they are nevertheless incompatible with high product quality.

Such faults may be detected by a visual examination, but they may in practice be difficult to carry out because of the manual labor involved and the length of time required. These defects may also be detected by known ultrasonic processes which automatically and directly measure the thickness of the tube at all points.

But the latter method of using ultrasonic waves is also difficult to use because the volume of metal being inspected at any instant is relatively small, so that the time required for a complete examination is large. Such testing of the thickness cannot for insatnce, be carried out as rapidly as the more usual method of inspection which relies for the discovery of faults on the detection of their sharp edges.

The present invention relates to a new method of detecting defects in metallic articles, and particularly in tubes, which defects consist in slight variations in their geometric characteristics which lead to slight depressions in the surfaces of the article.

The present invention envisages the completion of such an inspection in hte same time that conventional ultrasonic inspections are completed, by moving the tube relative to the inspection apparatus along a helix having a substantial pitch.

The process according to the invention is thus particularly suitable for use in association with the inspection process utilizing transverse ultrasonic waves commonly called the "echo method."

It is an object of the present invention to provide a new process for inspecting metallic articles, and especially tubes, which consists in causing a beam of ultrasonic radiation to penetrate the article to be inspected so as to produce multiple reflections of this beam between the surfaces of the article, preferably in such manner that the beam remains in a single plane, and receiving this beam in a restricted receiving zone located a certain distance away.

When the process according to the invention is used, if the surfaces of the metallic article which are in the zone between the point at which the ultrasonic beam enters the article, and the point at which this beam is detected remain absolutely identical, the beam during its successive reflections from the surfaces of the metallic article, always follows the same path and is consequently always detected under identical conditions.

If, on the other hand, the surface of the metallic article is deformed at any point along the path of the beam being reflected, even to a very slight extent, the beam will be deflected into a different direction, and for this reason will not be detected at the same terminal point. The defect in question may thus be measured quite easily.

The process according to the invention, is particularly useful inspecting tubes, slabs or sheets which may be moved past the inspecting device without changing the shape of their surfaces.

The process according to the invention also makes it possible to detect dense inclusions or even more or less open cracks which may be located inside the metal.

In fact, the ultrasonic beam is at least partially absorbed when it transverses such a fault and can no longer reach the detector, which releases an alarm indicating the defect.

SPECIFICATION

The distance between the points at which the ultrasonic beam enters the metallic article and that at which it is detected depends largely on the precision with which the testing is to be carried out. Thus, if the ultrasonic beam is caused to travel a greater distance through the inside of the metal, (which implies a larger number of reflections) this beam will obviously be more sensitive to a given angular deviation than would be the case in which a single reflection is used.

When it is desired to obtain greater precision, it is helpful to use a narrow ultrasonic beam so that any deviation of the beam during successive reflections inside the metal results in failure to detect the beam at the terminal point.

According to the invention the distance separating the point of entrance and the terminal point at which the ultrasonic beam leaves the metal may be of the order of from 20 to 200 mm.

In accordance with the invention the ultrasonic beam makes an angle of from 5–18 with the normal to the surface of the test material (said angle being measured in water). When the material being examined has two parallel surfaces, this angle is also the angle at which the beam emerges.

Figure 2:
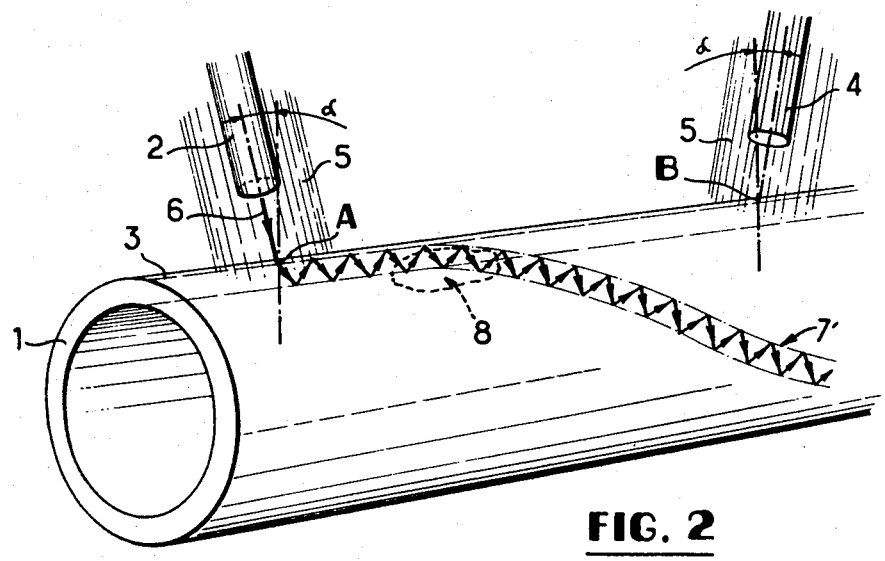

In order that the invention may be better understood, one embodiment thereof will now be described purely by way of illusrtation and example, with reference to the accompanying drawings, in which:

FIG. 1 schematically shows how the invention may be used to check the thickness of a steel tube;

FIG. 2 corresponds to FIG. 1, but shows a defect being detected; and

Figure 3:
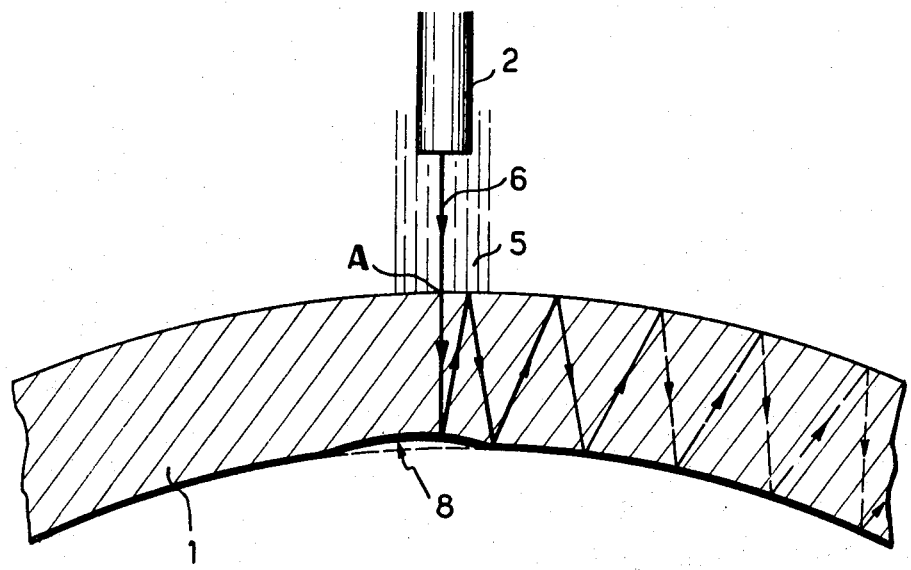

FIG. 3 is a transverse section taken through the tube shown in FIG. 2 and showing how the ultrasonic beam deviates from the plane in which it should be positioned.

The drawings show a steel tube 1 which is being inspected by the method according to the invention.

A transducer 2 directs a narrow ultrasonic beam to the point A on the upper generatrix 3 of the tube 1.

At a certain distance from the point A the axis of a transducer 4 is pointed at the point B on the same generatrix 3. This transducer detects the arrival of the ultrasonic beam emitted by the transducer 2.

In order to transmit the ultrasonic beam between the transducers and the tube 1, sheaths of water are provided and are shown schematically on the drawing since they are conventional in ultrasonic technique.

The axis of the beam 6 emitted by the transducer 2 is positioned in the diametral plane passing through the tube and the generatrix 3. It follows that if the tube has two strictly cylindrical and concentric surfaces, the beam 6 is successively reflected, as shown on FIG. 1, from the internal and external surfaces of the tube, but remains in exactly the same diametral plane as that in which it enters the tube. The exit beam 7 is thus in the same plane as the entrance beam 6, and it is always in this same plane that the axis of the transducer 4, directed toward the point B lies.

As may be seen from the drawing, the incident ultrasonic beam 6 is positioned at an angle $\alpha$ to the normal to the tube. This angle is measured in the water through which the beam is transmitted to the point A.

It will be appreciated that by adjusting the value of the angle $\alpha$ and the distance between the points A and B, it may be arranged for the beam to reach the point B after a predetermined number of reflections from the surfaces of the tube.

FIGS. 2 and 3 show how a defect 8 consisting of a slight change in the thickness of the wall of the tube 3 results in a deflection of the ultrasonic beam along the path 7 so that it fails to reach the transducer 4.

FIG. 3, in particular, shows how the projection of the incident beam in the plane of FIG. 3, which by construction is perpendicular to the internal and external surfaces of the tube when these surfaces are perfect, ceases to be perpendicular to the internal surface when that surface has a defect such as the defect 8 shown on the drawing.

Under these circumstances, the reflected beam is deflected from the plane passing through the generatrix 3 and the axis of the tube and continues along a helical path inside the tube even if it does not encounter any other defect.

It will be seen that the process according to the invention makes it possible to accurately detect any defects on the surface of the tube 1.

Several tests of the process just described have been carried out, with the following results.

In order to inspect a steel tube having an outer diameter of 244 mm. and a thickness of 8.9 mm., the transducers 2 and 4 having a diameter of 10 mm. and axes lying in a common plane passing through the axis of the tube are employed.

The distance to the tube from the end of each transducer may vary slightly and may be, for example, between 5 and 25 mm. Water is used as a coupling liquid. The angle between each transducer and the normal to the tube is equal to 10°.

The screen of the ultrasonic detector shows a rather dense series of echoes which are grouped and spaced by a certain distance from the starting echo. Each of these grouped echoes corresponds to a slightly different path taken by the beam which is reflected from the two surfaces of the tube.

When the transducers are 100 mm. apart (measured from point A to B), it is possible to detect a variation of 0.5 mm. in the thickness of the tube when this difference in thickness extends over a zone about 50 mm. in circumference.

It should be noted that the reception of the ultrasonic beam becomes normal and the said defect goes undetected when the distance between the two transducers becomes less than 65 mm.

It has also been found that even with the distance between the transducers of the order of 65 mm., defects ½ mm. deep may still be detected if these defects occur over a surface from 1 to 2 cm.$^2$, for example.

It will be seen that the process according to the invention makes it possible to very easily detect defects corresponding to variations in the thickness of tubes. When the distance between the two transducers is of the order of 100 mm., the surface of the tube to be tested should describe a helical path relative to the transducers having a pitch of about 100 mm.

This movement corresponds to those which are normal in ultrasonic inspection devices of conventional types.

It will be appreciated that the embodiment which has just been described has been given purely by way of example and may be modified as to detail without thereby departing from the basic principles of the invention.

In particular, it is clear that, while the process according to the invention is particularly well adapted to the inspection of steel tubes, it may also be used to inspect other articles, such as plates or other flat articles.

What is claimed is:

1. A method of testing a metallic wall having two parallel curved surfaces having a common axis of symmetry, which method comprises the steps of projecting a beam of ultrasonic radiation, causing said beam to enter said wall at a first point and to be reflected back and forth between the two surfaces of said wall in such a manner as to traverse a predetermined path beginning at said first point and lying in a plane containing said common axis in the absence of any defect in said wall, and detecting the presence of any portion of said beam reaching a second point on said path spaced from said first point.

2. A process as claimed in claim 1 in which the beam is emitted and detected by a pair of transducers, one of which is positioned near each of said points, and said beam is carried by a sheath of water between said wall and transducers.

3. A process as claimed in claim 2 in which the wall is caused to describe a helical path relative to said transducers, the pitch of said helix being equal to the distance between said points.

4. A process as claimed in claim 1 in which the direct distance between said points along said wall is between 20 and 200 mm.

5. A process as claimed in claim 1 in which said beam is caused to enter said wall at an angle of from 5 to 18° relative to a normal to said wall.

6. The method claimed in claim 1 in which said wall is that of a circular tube.

References Cited

UNITED STATES PATENTS 2,795,133  6/1957  Ots _____ 73—67.7

FOREIGN PATENTS 1,174,582  3/1959  France.
765,906  1/1957  Great Britain.

JAMES J. GILL, Primary Examiner